(12) United States Patent
Yokomori et al.

(10) Patent No.: US 7,354,100 B2
(45) Date of Patent: Apr. 8, 2008

(54) POWER SLIDE DEVICE FOR VEHICLE SLIDING DOOR

(75) Inventors: Kazuhito Yokomori, Nirasaki (JP); Hiroshi Satoh, Niraski (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 11/650,506

(22) Filed: Jan. 8, 2007

(65) Prior Publication Data

US 2007/0108799 A1 May 17, 2007

Related U.S. Application Data

(62) Division of application No. 11/094,472, filed on Mar. 31, 2005, now Pat. No. 7,159,930.

(30) Foreign Application Priority Data

| Mar. 31, 2004 | (JP) | ............................ | 2004-103698 |
| Mar. 31, 2004 | (JP) | ............................ | 2004-103699 |
| Mar. 31, 2004 | (JP) | ............................ | 2004-103700 |

(51) Int. Cl.
   *B60J 5/06* (2006.01)
(52) U.S. Cl. ........................................ 296/155; 49/360
(58) Field of Classification Search ................. 296/155; 49/360, 352, 324
   See application file for complete search history.

(56) References Cited

U.S. PATENT DOCUMENTS

| 4,640,050 | A | * | 2/1987 | Yamagishi et al. ............ 49/360 |
| 4,932,715 | A | * | 6/1990 | Kramer ....................... 296/155 |
| 5,063,710 | A | * | 11/1991 | Schap .......................... 49/280 |
| 5,168,666 | A | * | 12/1992 | Koura et al. .................. 49/360 |
| 5,233,789 | A | * | 8/1993 | Priest et al. .................. 49/360 |
| 5,323,570 | A | * | 6/1994 | Kuhlman et al. ............. 49/360 |
| 5,684,470 | A | * | 11/1997 | DeLand et al. ......... 340/825.69 |
| 5,737,875 | A | * | 4/1998 | Dowling et al. .............. 49/360 |
| 5,746,025 | A | * | 5/1998 | Shimura ....................... 49/360 |
| 5,806,246 | A | * | 9/1998 | Azuma ......................... 49/360 |
| 5,809,696 | A | * | 9/1998 | Watanabe ..................... 49/360 |
| 5,829,198 | A | * | 11/1998 | Watanabe ..................... 49/280 |
| 5,832,669 | A | * | 11/1998 | Mizuki et al. ................ 49/360 |
| 6,178,603 | B1 | * | 1/2001 | Lillig ......................... 24/132 R |
| 6,390,535 | B1 | * | 5/2002 | Chapman .................... 296/155 |
| 6,481,783 | B1 | * | 11/2002 | Rogers et al. .............. 296/155 |
| 6,530,619 | B2 | * | 3/2003 | Fukumoto et al. .......... 296/155 |
| 6,826,869 | B2 | * | 12/2004 | Oberheide ................... 49/360 |
| 6,866,250 | B2 | * | 3/2005 | Kita ........................ 296/146.4 |
| 7,073,291 | B2 | * | 7/2006 | Kawanobe et al. ............ 49/26 |
| 7,077,773 | B2 | * | 7/2006 | Chapman et al. ............ 49/360 |
| 2004/0016181 | A1 | * | 1/2004 | Yokomori et al. ............ 49/360 |
| 2006/0032142 | A1 | * | 2/2006 | Yokomori ..................... 49/324 |
| 2006/0112643 | A1 | * | 6/2006 | Yokomori et al. ............ 49/360 |

* cited by examiner

*Primary Examiner*—Kiran B. Patel
(74) *Attorney, Agent, or Firm*—Browdy and Neimark, P.L.L.C.

(57) ABSTRACT

This slide device comprises a first tension member connected to a distal end of an opening cable, a second tension member connected to a distal end of a closing cable, a lower roller bracket rotatable mounted on a sliding door, a first pin disposed at a front portion of a lower roller bracket, and a second pin disposed at a rear portion of the lower roller bracket. The front of the first tension member is rotatably connected to the first pin and the rear of the second tension member is rotatably connected to the second pin. The first tension member and the second tension member overlap with each other.

4 Claims, 4 Drawing Sheets

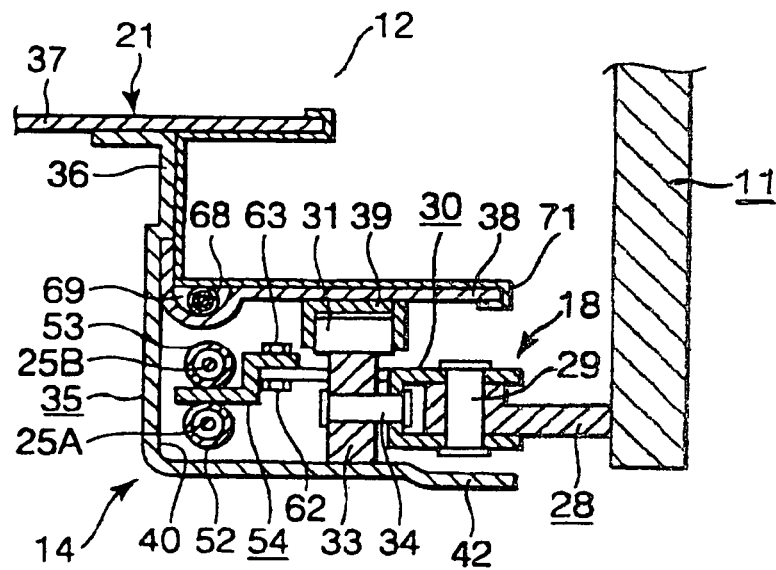
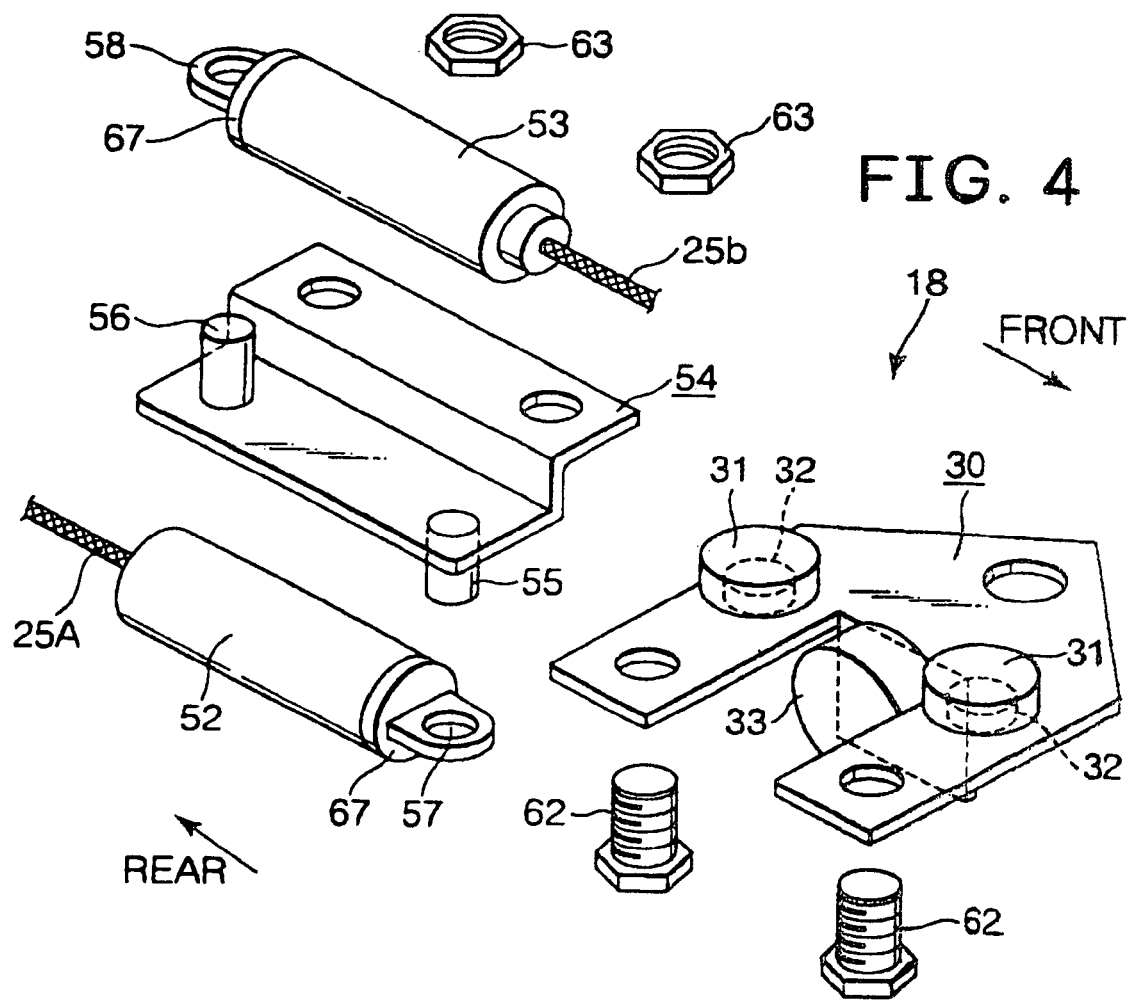

POWER SLIDE DEVICE FOR VEHICLE SLIDING DOOR

FIELD OF THE INVENTION

This invention relates to a power slide device for a vehicle sliding door, more particularly to a tension mechanism of the power slide device and a connection structure for a wire cable of the power drive device and a connection method.

DESCRIPTION OF THE RELATED ART

Power drive devices having a sliding door slidably mounted on a plurality of guide rails provided on a vehicle body, a power unit provided with a wire drum rotatable with a driving force generated by a motor, and a wire cable connecting the sliding door to the power unit, and are configured to cause the sliding door to slidingly move to the door-open direction or the door-closing direction are well known.

In general, the power unit may be disposed beneath a floor body in the proximity of a door aperture of the vehicle body (Japanese Utility Model Application Laid-Open No. 3-76982) or in an inner space of a quarter panel of the vehicle body (Japanese Patent Application Laid-Open No. 9-273358).

FIG. 7 shows a general arrangement in the former case. A door aperture C closable by a sliding door B is formed on a side of a vehicle body A, a lower guide rail D is fixed to the vehicle body A in the proximity of a lower section of the door aperture C, and a center guide rail F is secured to a quarter panel E constituting a rearward side wall, of the vehicle body A. The sliding door B has a lower roller bracket G slidably engaged with the lower guide rail D and a center roller bracket H slidably engaged with the center guide-rail F.

A power unit J is secured on a floor body of the vehicle body in the proximity of the door aperture C, an opening cable K1 of a wire cable K is connected to the lower bracket G on the sliding door B by way of a rear part of the lower guide rail D, and a closing cable K2 of the wire cable K is connected to the lower bracket G by way of a front part of the lower guide rail D.

FIG. 8 shows a general arrangement in the latter case. The power unit J of the latter case is disposed in an inner space L of the quarter panel E, the opening cable K1 of the wire cable K is connected to the center bracket H of the sliding door B by way of a rear part of the center guide rail F, and the closing cable K2 is connected to the center bracket H by way of a front part of the center guide rail F.

The power slide device is provided with a tension mechanism which absorbs variation in a wiring length of the wire cable K brought about in sliding movement of the sliding door B and keeps tension of the wire cable K constant. The front sections of the guide rails D, F are concavely curved toward the cabin and a maximum variation in the wiring length of the wire cable K appears when the roller brackets G, H travel along the curved sections.

The tension mechanism is disposed usually in the power unit J, however, there is a case where the tension mechanism is installed on the roller -brackets G, H, to which cable ends of the wire cable are connected.

A disadvantage in disposing the tension mechanism on the brackets G, H is that the brackets G, H tend to be longer in a lengthwise direction of the guide rails, and if the brackets G, H have been elongated dead spaces prohibiting the entry of the sliding door B are created at the both ends of the guide rails. In other words, the guide rails may be required to be elongated by the length corresponding to the dead spaces.

Another disadvantage is that the wire cable is bent with respect to a case of the tension mechanism mounted on the brackets G, H when the roller brackets G, H pass along the curved sections. If bent, the tension mechanism may fail to perform initial functions because of incremental friction acting on the wire cable and the wire cable may be damaged.

In the prior art as shown in FIG. 7, very complicated operations have been needed in connecting the both ends of the wire cable K to the lower bracket G. In other words, the lower bracket G which have been slidably engaged with the lower guide rail D are located beyond easy reach and thus required special skills for installation of the wire cable.

Also, with such objects as to reduce the size of the power unit J, and the like, there is a case where the tension mechanism of the wire cable K is mounted on the lower bracket G, however, this case has had yet another disadvantage to require more complicated installation operations.

Furthermore, the prior art as shown in FIG. 7 has had yet another disadvantage that the wire cable K is arranged in an annular configuration in a top view. Such wiring occupies a wider space for arranging the wire cable K, and thus influence over the space below the floor body (space for disposing such vehicle components as a drive shaft, gasoline tank, ducts for an air conditioner, etc.) may have been unavoidable.

In addition installation of the power unit J on the lower surface of the floor body makes the space below-the floor body (floor panel) smaller.

SUMMARY OF THE INVENTION

The object of this invention is to provide a tension mechanism which can be mounted on roller brackets of a sliding door in a rational manner.

Another object of this invention is to provide a connection structure which enables easy connection of a wire cable to a lower roller bracket and a connection method.

Yet another object of this invention is to provide a power slide device which enables to reduce a space for arranging the wire cable.

BRIEF DESCRIPTION OF THE DRAWINGS

FIG. 3 is a sectional view showing the portion of the floor body used for getting on and off the vehicle and the lower guide rail;

FIG. 4 is a disassembled perspective view showing a roller plate, a tension plate, and tension members;

DESCRIPTION OF THE PREFERRED EMBODIMENT

Figure 1:
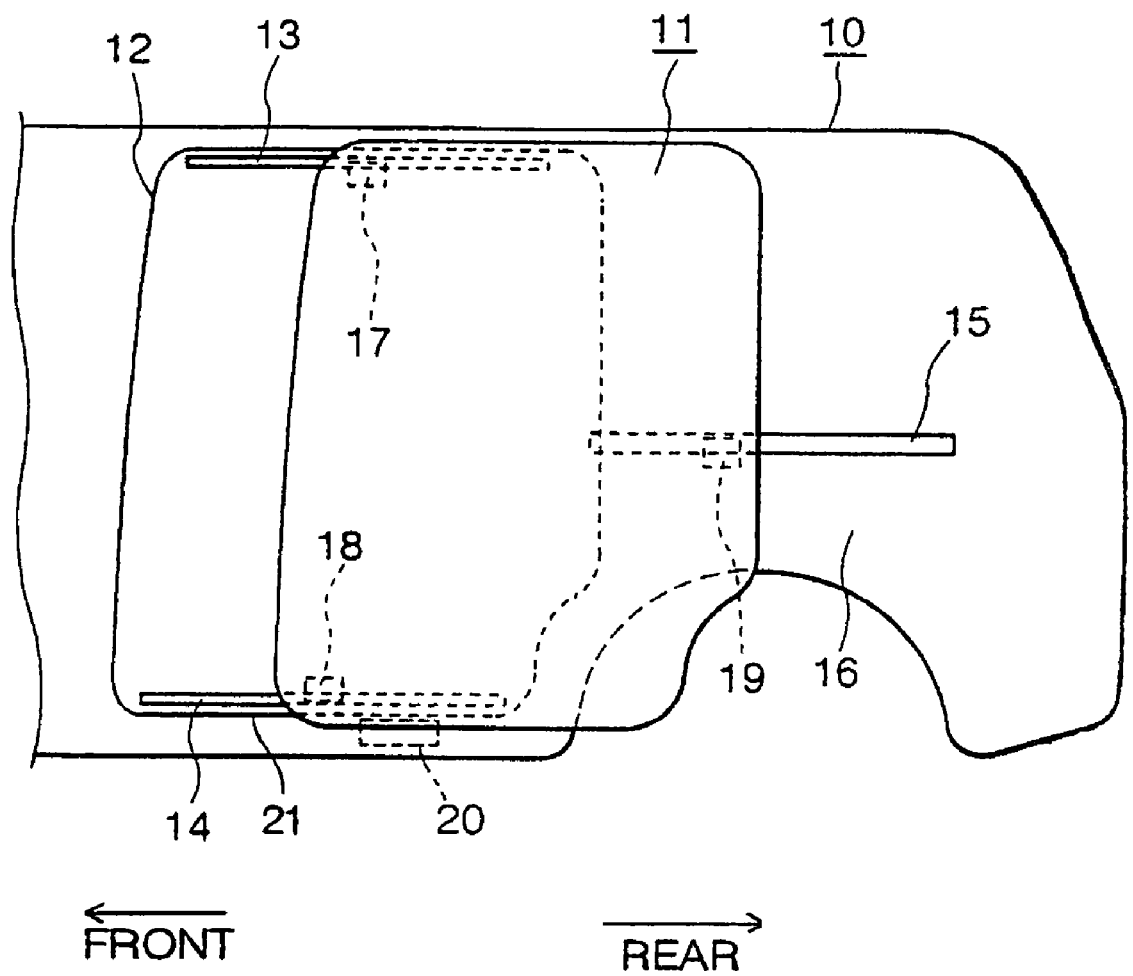
FIG. 1 is a side view of a vehicle provided with a sliding door.

FIG. 1 is a side view of a typical vehicle body 10 provided with a sliding door 11. On the side face of the vehicle body 10 a door aperture 12 closable by the sliding door 11 is formed. An upper guide rail 13 is fixed to the vehicle body 10 in the proximity of an upper part of the door aperture 12, a lower guide rail 14 is secured to the vehicle body 10 in the proximity of a lower part of the door aperture 12, and a center guide rail 15 is fixedly attached to a quarter panel 16 constituting a rearward side wall of the vehicle body 10. The sliding door 11 is provided with an upper roller bracket 17 slidably engaged with the upper guide rail 13, a lower roller bracket 18 slidably engaged with the lower guide rail 14, and a center roller bracket 19 slidably engaged with the center guide rail 15. Respective brackets 17, 18, 19 are preferable to be rotatably pivoted on the sliding door 11. The sliding door 11 is slidably mounted on the vehicle body 10 in the door-opening direction or the door-closing direction through the slidable engagement between brackets and guide rails. A power unit 20 of the power slide device in accordance with this invention is mounted on a floor body 21 (or may be disposed in a cabin-side space on the quarter panel 16).

Figure 6:
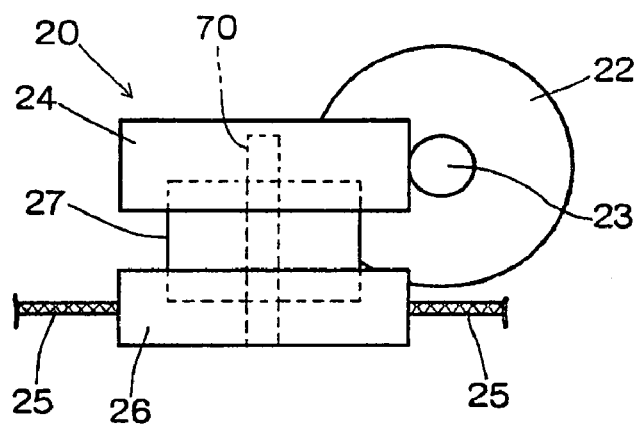
FIG. 6 is a schematic general arrangement of a power unit.
Figure 7:
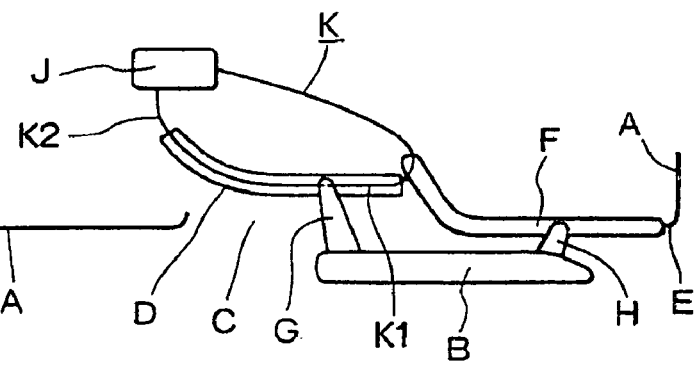
FIG. 7 is a schematic general arrangement of a conventional power slide device mounted on a floor body in the proximity of a door aperture.
Figure 8:
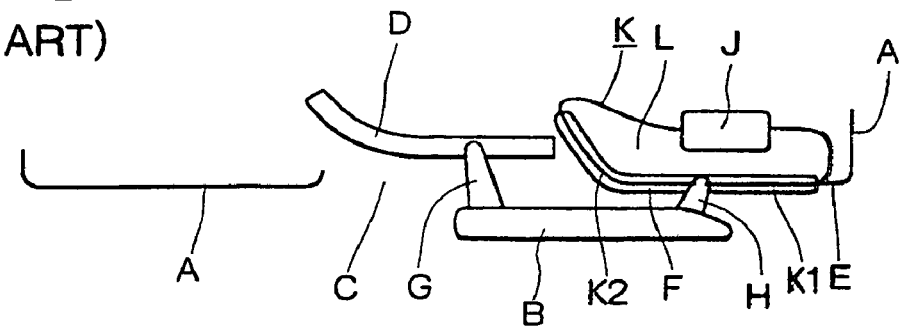
FIG. 8 is a schematic general arrangement of a conventional power slide device installed in an inner space of a quarter panel.

As shown in FIG. 6, the power unit 20 comprises a motor 22, a cylindrical worm 23 fixed to an output shaft of the motor 22, a worm wheel 24 engaged with the cylindrical worm 23, a wire drum 26 for winding or paying out a wire cable 25, and a clutch mechanism 27 disposed between the worm wheel 24 and the wire drum 26.

As shown in FIG. 3, the lower bracket 18 which is slidably engaged with the lower guide rail 14 is provided with a door stay 28 fixed on the sliding door 11 and a roller plate 30 pivoted on the door stay 28 by a vertical shaft 29. As shown in FIGS. 3, 4, upper rollers 31 are pivoted on the roller plate 30 by vertical roller shafts 32, and a lower roller 33 by a horizontal roller shaft 34.

Figure 2:
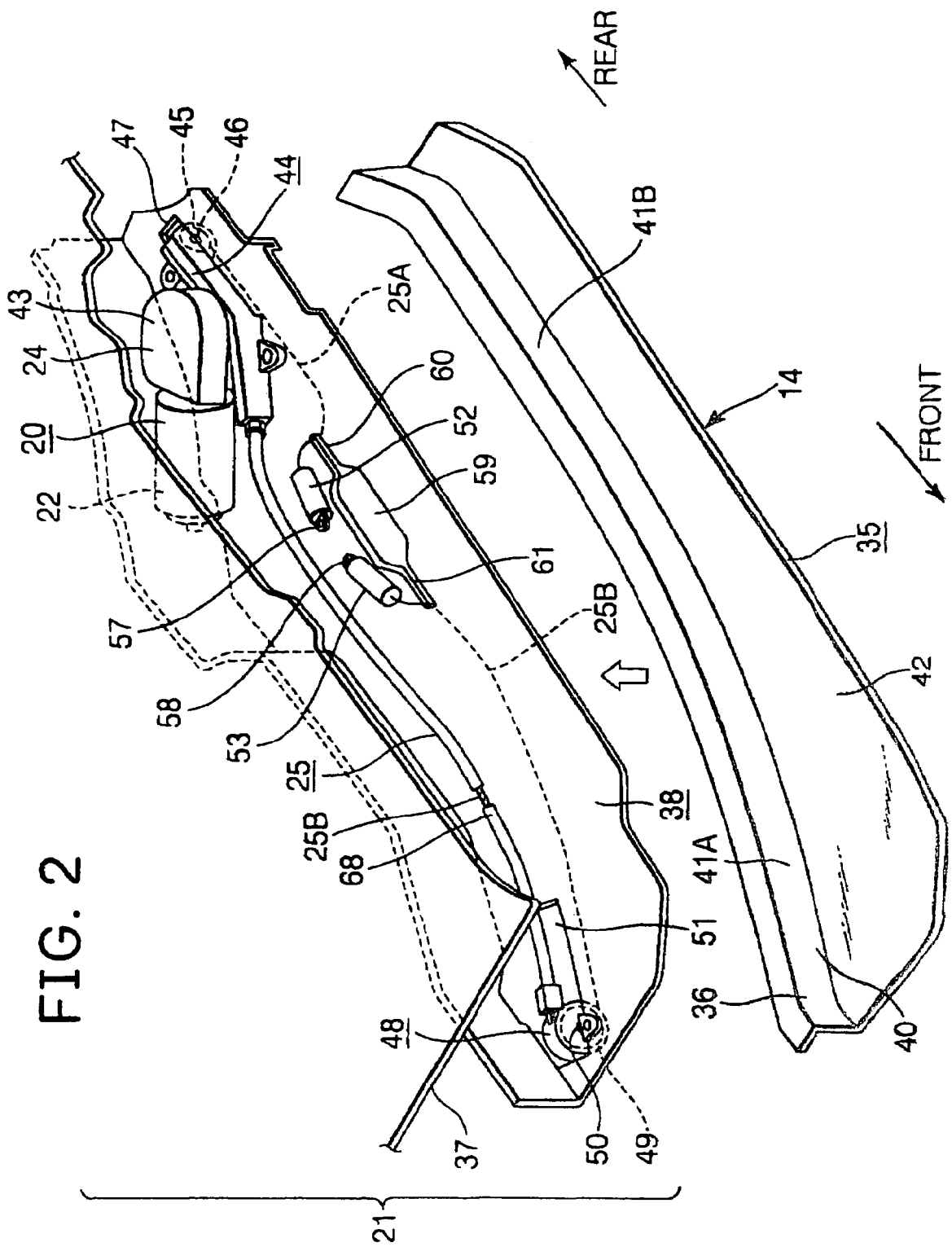
FIG. 2 is an exploded perspective view showing a portion of a floor body used for getting on and off the vehicle and a lower guide rail.

FIG. 2 shows the floor body 21 in the proximity of the door aperture 12 and an L-shaped plate 35 of the lower guide rail 14 secured to the floor body 21. An upper part of a vertical plate portion 36 of the L-shaped plate 35 is secured to a floor panel 37 constituting a cabin floor of the floor body 21 by bolt-and-nut, welding, and the like. A horizontal step panel 38 is secured at a middle in an upper-and-lower direction of the vertical plate portion 36 at a level one-step lower than the floor panel 37, and an upper roller guide 39 receiving the upper rollers 31 slidably therein is secured to the lower face of the step panel 38. The upper roller guide 39 constitutes a part of the lower guide rail 14.

A lower part of the vertical plate portion 36 is configured into a cable guide surface 40. The cable guide surface 40 has a similar profile with that of the upper roller guide 39 in a top view. The cable guide surface 40 has a front curved portion 41A curved concavely toward the cabin and a rear straight portion 41B. A horizontal support surface 42 is provided protruding from the lower edge of the vertical plate portion 36 in parallel to the step panel 38 with a given space apart therebetween. The lower roller 33 rolls on the support surface 42.

As shown in FIG. 2, the power unit 20 is preferable to be located at either the front or rear side on the step panel 38 or accommodated within a recess formed on the step panel 38 to avoid being an obstacle in getting on or off through the door aperture 12. A first pulley case 44 is provided integrally or as a separate body in the housing case 43 of the power unit 20. A first turnaround pulley 45 is pivoted at the distal end of the first pulley case 44 by a first transverse pulley shaft 46. The lower part of the distal end of the first pulley case 44 is protruded downward through a first opening 47 in the step panel 38.

A second pulley case 48 constituting a pair with the first pulley case 44 is arranged at the other side of the step panel 38 in its longitudinal direction, and a second turnaround pulley 49 is pivoted in the second pulley case 48 by a second transverse pulley shaft 50. The lower part of the second pulley case 48 is projected downward through a second opening 51 in the step panel 38.

The wire cable 25 comprises an opening cable 25A which pulls the sliding door 11 toward the door-opening direction when wound around the wire drum 26 and a closing cable 25B which pulls the sliding door 11 toward the door-closing direction when wound around the wire drum 26. The opening cable 25A extends rearward from the power unit 20 and turns to the front underneath the step panel 38 by way of the first turnaround pulley 45, and the closing cable 25B extends frontward from the power unit 20 and turns to the rear beneath the step panel 38 by way of the second turnaround pulley 49.

The distal end of the opening cable 25A is connected to a first tension member 52 and the distal end of the closing cable 25B is connected to a second tension member 53. First and second retention parts 57, 58 are provided at the distal ends of the first and second tension members 52, 53, respectively, the first and second retention parts 57, 58 being retained on first and second pins 55, 56 disposed on a tension plate 54.

Prior to mounting on the tension plate 54, the tension members 52, 53 are drawn out in an upward direction through a service hole 59 formed in the step panel 38, and held temporarily on the step panel 38 by inserting the cables 25A, 25B into first and second temporary retention slots 60, 61 formed at the both lengthwise ends of the service hole 59. The temporary slots 60, 61 are preferable to be slots elongated along a moving direction of the wire cable 25, the width thereof being larger than the diameter of the wire cable 25 but smaller than that of the tension members 52, 53.

The tension plate 54 is formed with a dimension passable through the service hole 59. The tension members 52, 53 temporarily retained in the slots 60, 61 are connected to the pins 55, 56 of the tension plate 54 utilizing a large open space above the step panel 38, and then are returned to the position beneath the step panel 38 through the service hole 59 together with the tension plate 54. The tension plate 54 is secured to the roller plate 30 by bolts 62 and nuts 63. The wire cable 25 having been connected to the tension plate 54 is kept in an annular form in a side view.

Figure 5:
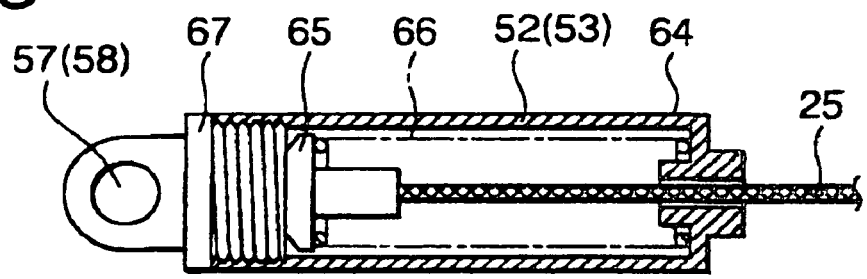
FIG. 5 is a sectional view showing one of the tension members.

The tension members 52, 53 are identical and, as shown in FIG. 5, each tension case 64 has an elongated cylindrical form extending in a wiring direction of the wire cable 25. A tension spring 66 abutting on a cable end 65 of the cable 25 is disposed in the case 64. The retention part 57 (58) is provided integrally on a case cap 67 threadedly engaging the open end of the tension case 64. The case cap 67 having threads can be easily mounted on the tension case 64 compressing the tension spring 66 when rotated.

The first pin 55 of the tension plate 54 is located in the front of the tension plate 54 and the second pin 56 is located in the rear of the tension plate 54. When the first tension member 52 and the second tension members 53 are mounted on the tension plate 54, they overlap with each other in the vertical direction.

As shown in FIG. 2, an elastic cable sheath (cable outer) 68 is mounted over a portion of the wire cable 25 disposed on or above the upper surface of the step panel 38, whereby the wire cable 25 between the power unit 20 and the second pulley case 48 may be freely wired without affecting tension of the wire cable 25. The cable sheath 68 is disposed in an elongated recess 69 formed on the step panel 38 as shown. in FIG. 3, thereby rendering the upper surface of the step panel 38 flat.

The wire drum 26 of the power unit 20 rotates about a vertical drum shaft 70, the wire drum 26 being arranged in close proximity of the step panel 38. As a result, the portion of the wire cable 25 between the first turnaround pulley 45 and the wire drum 26 can be maintained at almost normal to the drum shaft 70 for the wire drum 26. A plastics step cover 71 is mounted on the outer surface of the step panel 38.

(Operations)

The power unit 20 having the first pulley case 44, and the second pulley case 48 are mounted on the step panel 38 first. In this case, the second pulley case 48 is held for temporary retention at the power unit side within the elongated second opening 51. Then, the tension members 52, 53 connected to the distal ends of the wire cable 25 are drawn up the above of the step panel 38 through the service hole 59 in the step panel 38 and retained in the temporary retention slots 60, 61.

Then, the tension members 52, 53 held in the temporary retention slots 60, 61 are mounted to the tension plate 54, being a separate body prior to be fixed onto the roller plate 30 (lower bracket 18), the tension plate 54 and the tension members 52, 53 are returned to the lower side of the step panel 38 through the service hole 59, and by means of the bolts 62 and the nuts 62 the tension plate 54 is secured to the roller plate 30 pivoted on the door stay 28 of the sliding door 11.

Because the second pulley case 48 is held at the power unit 20 side in the elongated second opening. 51 for temporary retention, the wire cable 25 is in a slack state, and this makes the mounting operations easy. Also, as the tension plate 54 is secured to the roller plate 30 through the service hole 59, the operations for fixing the tension plate 54 to the roller plate 30 can be performed easily even if only a small space is available between the step panel 38 and the lower guide rail 14 (support surface 42) disposed beneath the step panel 38.

After fixing the tension plate 54 to the roller plate 30, the second pulley case 48 under the temporary retention is pulled to a direction away from the power unit 20 in the second opening 51 to apply an appropriate initial tension to the wire cable 25, and then the second pulley case 48 is fixedly connected to the step panel 38.

In case of the power slide unit of this invention configured in a manner as above described, because the first tension member 52 and the second tension member 53 mounted on the tension plate 54 overlap with each other, the tension mechanism can be formed with a length in the lengthwise direction of the guide rails substantially same with that of one tension member. Accordingly, the length of the tension mechanism and also the length of the tension plate 54 on which the tension mechanism is mounted can be reduced, whereby the sliding door 11 is caused to move a maximum distance between the both ends of the lower guide rail 14.

When the wire cable 25 arranged beneath the step panel 38 is moved along the cable guide surface 40 of the L-shaped plate 35 having a shape similar to that of the upper roller guide 39, the first tension member 52 and the second tension member 53 are configured to swing about the pins 55, 56 disposed on the tension plate 54. Consequently, when the tension plate 54 travels along the front curved portion 41A of the lower guide rail 14, the tension members 52, 53 swing in pulling directions of the wire cable 25, whereby bending of the wire cable 25 relative to the tension members 52, 53 can be prevented.

In accordance with this invention, the first turnaround pulley 45 and the second turnaround pulley 49 disposed on the both lengthwise ends of the step panel 38 are configured to be rotatable about the transverse pulley shafts 46, 50, and the step panel 38 is arranged in a manner to be sandwiched between the wire cable 25 in the vertical direction. With this arrangement, the space measured in the vehicle width direction required for disposing the wire cable 25, consequently the width of the step panel 38, can be reduced, whereby adverse impact on the lower space of the floor panel 37 (location for disposing a-drive shaft, gasoline tank, ducts for air conditioner, etc.) can be minimized.

Through attaching the step cover 71 to the step panel 38, the power unit 20 provided with the first pulley case 44, the second pulley case 48, the service hole 59, and the cable sheath 68 can be hidden from view. In addition, as the power unit 20 and the second pulley case 48 are located close to the both ends lengthwise of the step panel 38 and also the cable sheath 68 are laid in the recess 69, an attractive, wide step surface having the cover plate 71 on the step panel 38 can be obtained.

(Advantages)

As the first tension member 52 and the second tension member 53 are mounted on the roller bracket overlapping with each other in this invention, the length of the tension mechanism in the length direction of the guide rail can be shortened, and the generation of the dead spaces prohibiting the entry of the sliding door at the both ends of the guide rail can be constrained into a minimum range.

Because the first tension member 52 and the second tension member 53 swing about the pins 55, 56 disposed on the roller bracket, bending of the wire cable 25 is avoided even if the roller bracket has rotated relative to the sliding door, whereby incremental resistance acting on the wire cable 25 and consequently any damage to the wire cable 25 can be reduced.

Through the service hole 59 formed in the step panel 38, each of the cable ends 65 of the wire cable 25 can be secured to the plate 54 in the large open space above the step panel 38. Also, the plate 54 can be fixed to the lower bracket 18 after moving to the location beneath the step panel 38 through the service-hole 59. Thus, both the connection of the cable ends 65 to the plate 54 and the fixing of the plate 54 to the lower bracket 18 become notably easier than the conventional technology.

The temporary retention slots 60, 61 at the periphery of the service hole 59 enable to hold each of the cable ends 65 being exposed above the step panel 38, thereby ensuring much easier mounting operations.

As the wire cable 25 has an annular form in a side view and catches the step panel from both sides vertically, the space measured in a vehicle width direction required for disposing the wire cable 25 can be reduced, and adverse impact on the lower space of the floor panel 37 (location for disposing a drive shaft, gasoline tank, ducts for air conditioner, etc.) can be minimized.

The arrangement disposing the step panel 38 between the wire cable 25 in the vertical direction enables the power unit 20 to be fixed on the upper surface of the step panel 38, whereby adverse impact on the lower space below the floor panel 37 can be minimized.

The laying of the wire cable 25 in the recess 69 formed on the upper surface of the step panel 38 makes the step surface wide and attractive.

The step cover 71 mounted on the step panel 38 hides the power unit 20 from view.

What is claimed is:

1. A power slide device comprising:
    a lower roller bracket on a sliding door slidably mounted on a lower guide rail disposed on a vehicle body;
    a power unit having a wire drum rotated by a motor and secured to a floor body of the vehicle body;
    a first turnaround pulley disposed in the proximity of a rear portion of the lower guide rail;
    a second turnaround pulley disposed in the proximity of a front portion of the lower guide rail;
    a wire cable comprising an opening cable and a closing cable, first ends of said opening cable and said closing cable being connected to the wire drum, a second end of said opening cable extending rearward from the power unit and returning to the front by way of the first turnaround pulley to be connected to the lower roller bracket, a second end of said closing cable extending frontward from the power unit and returning to the rear by way of the second turnaround pulley to be connected to the lower roller bracket;
    wherein said lower guide rail is disposed beneath a step panel of the floor body;
    wherein said wire cable is wired in a manner to encircle the step panel from both sides vertically;
    a service hole formed in the step panel;
    wherein said second ends of the opening cable and the closing cable are connected to a plate having a dimension passable through the service hole;
    wherein said plate is secured to the lower roller bracket after having been moved below the step panel by way of the service hole.

2. The power slide device according to claim 1, wherein first and second temporary retention slots are formed extending from the periphery of the service hole which are engageable with the respective second ends of the opening cable and the closing cable drawn up the step panel through the service hole and can hold the second ends exposing on the upper surface of the step panel.

3. The power slide device according to claim 1, wherein the respective second ends of the opening cable and the closing cable are connected to the plate by means of a first tension member and a second tension member, and the service hole has a dimension that permits the plate connected to the first tension member and the second tension member to pass through the service hole from above to down.

4. The power slide device according to claim 2, wherein the respective second ends of the opening cable and the closing cable are connected to the plate by means of a first tension member and a second tension member, and the service hole has a dimension that permits the plate connected to the first tension member and the second tension member to pass through the service hole from above to down.

* * * * *